United States Patent
Kim et al.

(10) Patent No.: US 12,286,218 B2
(45) Date of Patent: Apr. 29, 2025

(54) LANDING GEAR SYSTEM WITH MAGNETORHEOLOGICAL DAMPER

(71) Applicants: Hyundai Motor Company, Seoul (KR); Kia Corporation, Seoul (KR)

(72) Inventors: Choung Hyoung Kim, Anyang-si (KR); Jung Hyun Lee, Gunpo-si (KR); Eugene Hwang, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 85 days.

(21) Appl. No.: 18/133,850

(22) Filed: Apr. 12, 2023

(65) Prior Publication Data
US 2024/0182159 A1 Jun. 6, 2024

(30) Foreign Application Priority Data
Dec. 6, 2022 (KR) .................. 10-2022-0168595

(51) Int. Cl.
*B64C 25/34* (2006.01)
*B64C 25/60* (2006.01)
*G05D 15/01* (2006.01)

(52) U.S. Cl.
CPC ............. *B64C 25/34* (2013.01); *B64C 25/60* (2013.01); *G05D 15/01* (2013.01)

(58) Field of Classification Search
CPC ......... B64C 25/34; B64C 25/60; B64C 25/58; B64C 25/001; G05D 15/01; F16F 9/535; F16F 9/20; F16F 2224/045; F16F 2222/06
See application file for complete search history.

(56) References Cited

U.S. PATENT DOCUMENTS 2,667,237 A * 1/1954 Rabinow ................. H01F 1/447
188/164
2,669,325 A * 2/1954 Raines .................... F41A 25/00
188/164
(Continued)

FOREIGN PATENT DOCUMENTS

CN 114623184 A 6/2022
EP 3298300 B1 9/2022
(Continued)

OTHER PUBLICATIONS

Apr. 11, 2024—(EP) Extended European Search Report—App 23208771.8.

(Continued)

*Primary Examiner* — Medhat Badawi
(74) *Attorney, Agent, or Firm* — Banner & Witcoff, Ltd.

(57) ABSTRACT

A landing gear system may include: a casing coupled to a fuselage of an aircraft, such as an urban air mobility vehicle; a steering, one side of which is inserted into the casing and the other side of which is connected to a tire; a magnetorheological (MR) damper including a cylinder coupled to the casing and a piston coupled to the steering rod; a sensor unit configured to measure a condition of the urban air mobility vehicle; and a controller configured to control damping force of the MR damper based on measurement data of the sensor unit. The sensor unit may include a first sensor for measuring a stroke of the MR damper and a second sensor for measuring an acceleration of the casing.

14 Claims, 4 Drawing Sheets

(56) References Cited

U.S. PATENT DOCUMENTS

| | | | | |
|---|---|---|---|---|
| 2,846,028 A * | 8/1958 | Roland | ............... | F16F 9/535 |
| | | | | 188/267.2 |
| 2,973,969 A * | 3/1961 | Thall | ............... | F16F 9/535 |
| | | | | 188/267.2 |
| 3,006,656 A * | 10/1961 | Hall | ............... | B60G 17/0157 |
| | | | | 280/5.509 |
| 3,059,915 A * | 10/1962 | Kemelhor | ............... | F16F 9/535 |
| | | | | 60/326 |
| 3,174,587 A * | 3/1965 | Walton | ............... | B60G 17/0152 |
| | | | | 267/221 |
| 4,351,515 A * | 9/1982 | Yoshida | ............... | F16F 9/535 |
| | | | | 267/225 |
| 4,896,752 A * | 1/1990 | Shtarkman | ............... | F16F 9/532 |
| | | | | 188/315 |
| 4,942,947 A * | 7/1990 | Shtarkman | ............... | F16F 9/145 |
| | | | | 188/290 |
| 5,396,973 A * | 3/1995 | Schwemmer | ............... | F16F 9/38 |
| | | | | 188/266.2 |
| 6,019,201 A * | 2/2000 | Gordaninejad | ............... | F16F 9/535 |
| | | | | 267/140.14 |
| 6,694,856 B1 * | 2/2004 | Chen | ............... | F16F 13/007 |
| | | | | 89/43.01 |
| 6,752,425 B2 * | 6/2004 | Loh | ............... | B62D 7/224 |
| | | | | 280/90 |
| 10,711,861 B1 * | 7/2020 | Kasprzak | ............... | F16F 9/063 |
| 11,180,253 B1 * | 11/2021 | Seeley | ............... | B64D 1/16 |
| 11,198,519 B1 * | 12/2021 | Seeley | ............... | B64F 1/002 |
| 2001/0048049 A1 * | 12/2001 | Carter, Jr. | ............... | B64C 25/60 |
| | | | | 244/104 FP |
| 2009/0114765 A1 * | 5/2009 | Cox | ............... | B64C 25/40 |
| | | | | 244/50 |
| 2016/0238100 A1 * | 8/2016 | Smith | ............... | B64C 25/60 |
| 2018/0244373 A1 * | 8/2018 | Mellor | ............... | B64C 25/34 |
| 2021/0381575 A1 * | 12/2021 | Nyamagoudar | ............... | F16F 9/532 |
| 2022/0169400 A1 * | 6/2022 | Seeley | ............... | B64F 1/322 |
| 2022/0185458 A1 * | 6/2022 | Kim | ............... | B64C 25/505 |
| 2023/0182892 A1 * | 6/2023 | Nagaraja | ............... | B64C 25/505 |
| | | | | 188/267.2 |
| 2024/0151292 A1 * | 5/2024 | Kasprzak | ............... | F16F 9/537 |
| 2024/0182159 A1 * | 6/2024 | Kim | ............... | B64C 25/60 |

FOREIGN PATENT DOCUMENTS

| | | |
|---|---|---|
| JP | 2006273219 A | 10/2006 |
| KR | 10 2018 0099555 A | 9/2018 |
| KR | 101942366 B1 | 1/2019 |
| KR | 102038011 B1 | 10/2019 |
| KR | 102186762 B1 | 12/2020 |
| KR | 10 2022 0085401 A | 6/2022 |

OTHER PUBLICATIONS

Yoon, Ji-Young et al., "New control logic based on mechanical energy conservation for aircraft landing gear system with magnetorheological dampers", Smart Materials and Structures, vol. 29, No. 8, Jul. 10, 2020, 15 pages.

* cited by examiner

LANDING GEAR SYSTEM WITH MAGNETORHEOLOGICAL DAMPER

CROSS-REFERENCE TO RELATED APPLICATION (S)

This application claims benefit of priority to Korean Patent Application No. 10-2022-0168595 filed on Dec. 6, 2022, in the Korean Intellectual Property Office, the disclosure of which is incorporated herein by reference in its entirety.

BACKGROUND

1. Field

The present disclosure relates to a landing gear system with a magnetorheological (MR) damper.

2. Description of Related Art

A damping force control method of a hydraulic or pneumatic buffer used in the landing gear of an urban air mobility vehicle is to control the damping force by changing an effective orifice cross-sectional area using an orifice and a metering pin. The above-described hydraulic or pneumatic buffer may optimize damper performance by tuning a design value during manufacturing.

A magnetorheological (MR) damper is a device that generates an electromagnetic field by a current applied from the outside, the electromagnetic field changes a viscosity of MR fluid, which changes a damping force. When a current is transmitted, an electromagnetic field is formed, which may increase the viscosity of the MR fluid in a flow path. A piston may then generate a high damping force while sliding along the high viscosity fluid. An MR damper landing gear is a semi-active landing gear that increases impact absorption efficiency by changing the characteristics of MR fluid. There is a need for a technology for detecting the state of an aircraft having MR damper landing gear (e.g., an urban air mobility vehicle with MR damper landing gear) and efficiently controlling the MR damper, e.g. so as to control damping force in real time.

SUMMARY

The following summary presents a simplified summary of certain features. The summary is not an extensive overview and is not intended to identify key or critical elements.

Systems, apparatuses, and methods are described for a landing gear with a magnetorheological (MR) damper. A landing gear system may comprise a casing configured to couple to a fuselage of an aircraft; a steering rod comprising a first side inserted into the casing and a second side connected to a tire; a magnetorheological (MR) damper, in the casing, that comprises a cylinder coupled to the casing and a piston coupled to the steering rod; a sensor unit configured to acquire measurement data of a state of the aircraft; and a controller configured to control, based on the measurement data, a damping force of the MR damper. The sensor unit may comprise a first sensor for measuring a stroke of the MR damper and a second sensor for measuring an acceleration of the casing.

A landing gear system may also, or alternatively, comprise a casing configured to couple to a fuselage of an aircraft; a magnetorheological (MR) damper, in the casing, that comprises a cylinder coupled to the casing, a piston configured to absorb an impact of the aircraft and reciprocate linearly inside the cylinder, and an MR fluid configured to move between the cylinder and the piston; a sensor unit configured to check a relative motion condition of the cylinder and the piston; and a controller configured to control a magnitude of a current applied to the MR damper based on measurement data of the sensor unit.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, specific examples of the present disclosure will be described and illustrated in the drawings. However, the examples are not intended for limiting of the disclosed subject matter. The present disclosure should be construed to extend to any alterations, equivalents and/or substitutes besides the accompanying drawings and following detailed examples.

Although the terms first, second, etc., may be used herein to describe various elements, these elements should not be limited by these terms. These terms are generally only used to distinguish one element from another. For example, a first element could be termed a second element, and, similarly, a second element could be termed a first element, without departing from the scope of the present disclosure. The term of "and/or" encompasses a combination of items or any one of the items.

The term "a" used herein is for the purpose of describing particular examples only and is not intended to be limiting of the present disclosure. The singular also includes the plural unless specifically stated otherwise in the phrase. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which examples of the present disclosure belong. It will be further understood that the terms, such as those defined in commonly used dictionaries, should be interpreted as having meanings that are consistent with their meanings in the context of the relevant art and will not be interpreted in an idealized or overly formal sense unless expressly so defined herein.

In the present specification, urban air mobility vehicle may refer to a mobility vehicle that may move by flying in the sky. That is, in addition to referring to helicopters, drones, fixed-wing airplanes, and the like, urban air mobility vehicle may include vehicles that can move on the ground using wheels and then fly with the wheels separated from the ground. In addition, an aircraft may include manned and unmanned aircraft. The manned aircraft may include an airplane that can be operated by autonomous flight, in addition to an airplane controlled by a pilot.

Hereinafter, examples of the present disclosure will be described with reference to the attached drawings.

Figure 1:
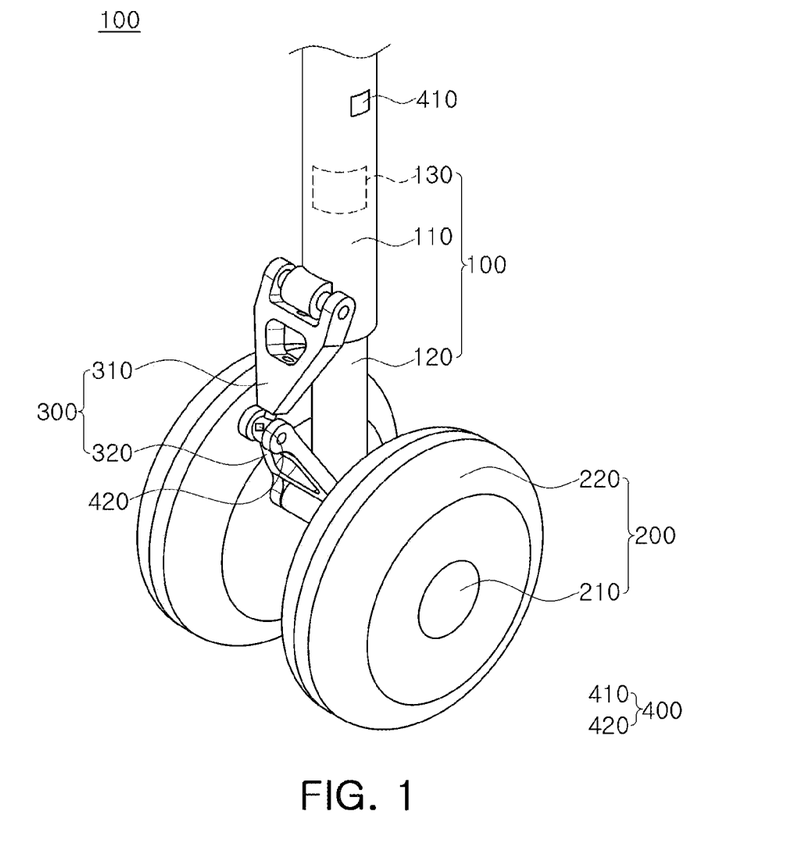
FIG. 1 is a perspective view of a landing gear system with an MR damper according to an example of the present disclosure.
Figure 2:
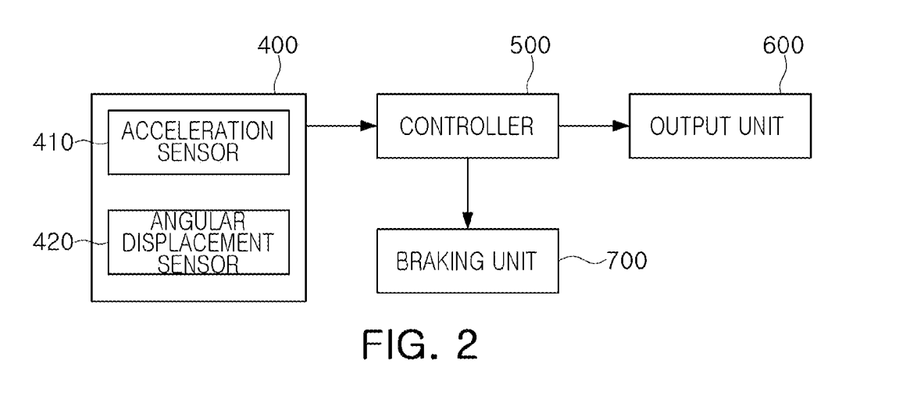
FIG. 2 is a block diagram of the landing gear system with an MR damper according to an example of the present disclosure.
Figure 3A:
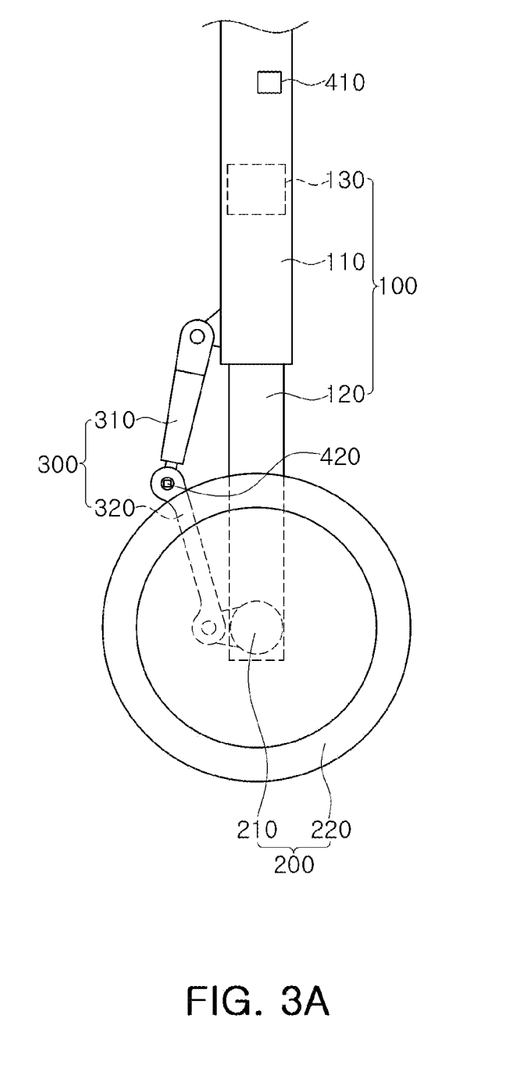
FIG. 3A and FIG. 3B are a view illustrating a movement of a link unit of the landing gear system with an MR damper according to an example of the present disclosure.
Figure 3B:
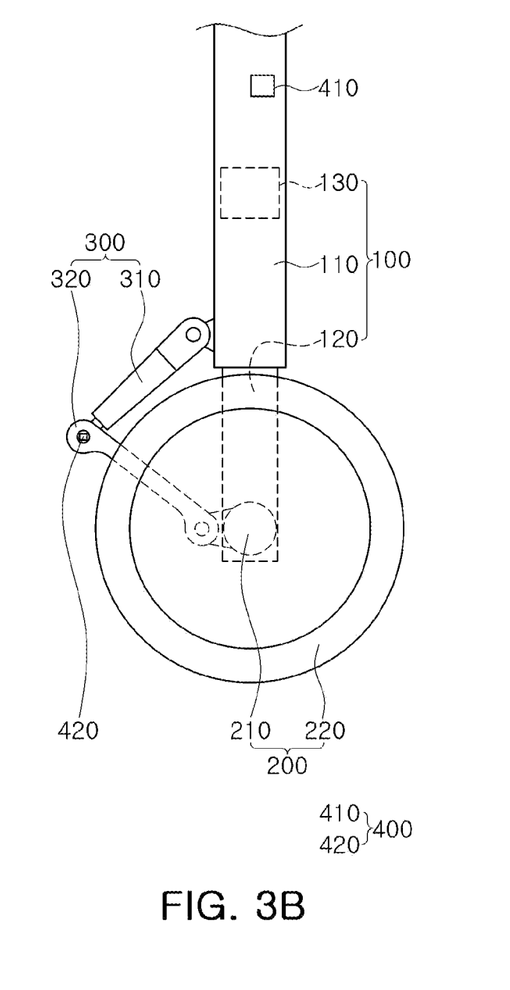

FIG. 1 is a perspective view of a landing gear system with an MR damper according to an example of the present disclosure, FIG. 2 is a block diagram of the landing gear system with an MR damper according to an example of the present disclosure, and FIG. 3A and FIG. 3B are a view illustrating a movement of a link unit of the landing gear system with an MR damper according to an example of the present disclosure.

Referring to FIGS. 1 to 2, a landing gear system with an MR damper according to an example of the present disclosure may include a landing gear 100, a wheel unit 200, a link unit 300, and a sensor unit 400.

The landing gear 100 may include a casing 110, a steering rod 120, and an MR damper 130.

In the casing 110, one side thereof may be coupled to a fuselage of an aircraft (e.g., an urban air mobility vehicle) so as to support a load, a magnetorheological (MR) damper is included inside, and the other side thereof may have a cylindrical shape provided to penetrate through the steering rod 120 configured to steer a driving direction of the urban air mobility vehicle by controlling a direction of wheels.

The MR damper 130 may be a damper capable of adjusting damping force by controlling a current applied to the damper. Unlike hydraulic dampers that control the damping force by changing an effective orifice cross-sectional area using an orifice and a metering pin, the MR damper 130 adjusts the damping force by controlling the current applied to the damper, thereby adjusting the damping force of the MR damper 130 according to external situations. Details of the MR damper 130 will be described below.

Referring back to FIG. 1, the wheel unit 200 may include a wheel shaft 210 which may be coupled to an end of the steering rod 120. The wheel shaft 210 may be configured to rotate with rotation of the steering rod 120. A tire 220 may be rotatably fixed to the wheel shaft 210. For example, as in FIG. 1, two tires 220 may be rotatably fixed to opposite ends of the wheel shaft 210. The wheel unit 200 may be configured to rotate according to the rotation of the steering rod 120, which may allow for steering the driving direction of the urban air mobility vehicle.

Figure 4A:
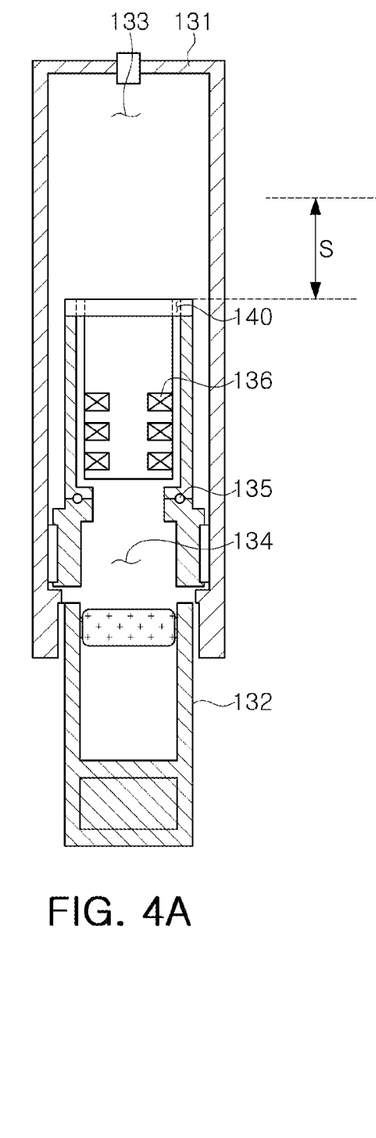
FIG. 4A and FIG. 4B are a view illustrating an operation of the MR damper according to an example of the present disclosure.
Figure 4B:
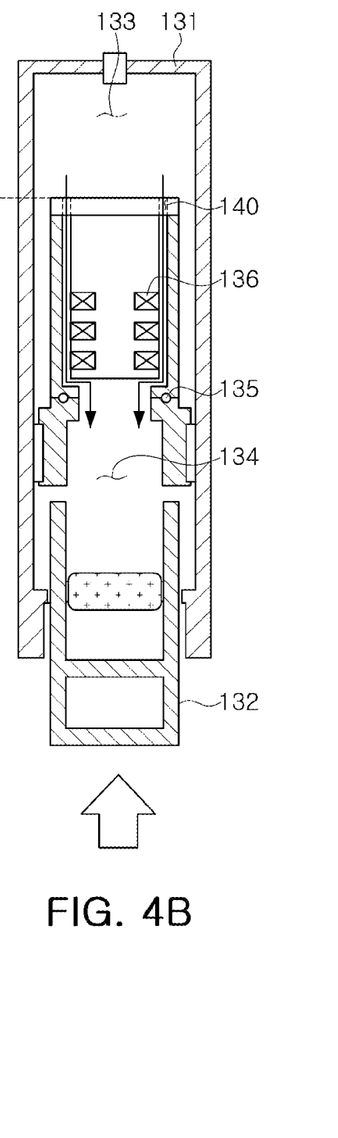

The link unit 300 may include a first link 310 and a second link 320 rotatably coupled to the first link 310. The first link 310 may be coupled to the casing 110, and the second link 320 may be coupled to the steering rod 120 or the wheel unit 200. Referring to FIG. 3A and FIG. 3B, the link unit 300 may be configured to help the steering rod 120, connected to the MR damper 130, to move up and down along the casing 110 (e.g., in response to an impact force, such as an impact of landing the aircraft). When the steering rod 120 moves up and down along the casing 110, an angle formed by the first link 310 and the second link 320 changes. FIG. 3A exemplarily illustrates a state before the tire 220 is in contact with the ground, and FIG. 3B exemplarily illustrates a state after the tire 220 is in contact with the ground and a load of the aircraft (e.g., a load of an urban air mobility vehicle) is applied to the landing gear with the tire 220 into contact with the ground. When the tire 220 is contact with the ground, a load applied during landing is transmitted through the tire 220. Referring to FIG. 4A and FIG. 4B, which will be discussed in more detail below, a change in a cylinder 131 of the MR damper 130 and a stroke S of a piston 132 of the MR damper 130 may be determined by measuring the change in the angle formed by the first link 310 and the second link 320. The piston 132 of the MR damper 130 may be further inserted into the cylinder 131 upon contact of the tire 220 on the ground, or other load application, which may shorten a distance between the casing 110 and the wheel shaft 210, which may to change the angle formed by the first link 310 and the second link 320. In other words, the angle formed by the first link 310 and the second link 320 changes according to the load applied to the landing gear, and the stroke S of the MR damper 130 may be determined based on the first link 310 and the second link 320 using geometric concepts, such as the Pythagorean theorem.

Referring to FIG. 2, the sensor unit 400 may include an acceleration sensor 410 and an angular displacement sensor 420.

The acceleration sensor 410 may include a first acceleration sensor and a second acceleration sensor, the first acceleration sensor may be an acceleration sensor provided in the casing 110, and the second acceleration sensor may be an acceleration sensor configured to be provided in a fuselage of the aircraft. The acceleration sensor 410 according to an example of the present disclosure may refer to the first acceleration sensor mounted in the casing 110 rather than the second acceleration sensor provided in the aircraft. The state of the landing gear 100 and the state of the MR damper 130 may be more accurately checked using the acceleration sensor 410 provided in the casing of the landing gear. The acceleration sensor 410 according to an example of the present disclosure uses the first acceleration sensor, but may additionally or alternatively use the second acceleration sensor provided in the aircraft for convenience and/or to derive a more accurate acceleration value. The acceleration sensor 410 may be configured to measure acceleration in one, two, or three dimensions.

As the angular displacement sensor 420 is installed in a coupling portion of the first link 310 and the second link 320 so that the steering rod 120 performs a linear motion with respect to the casing 110, the angular displacement sensor 420 may measure an angle between the first link 310 and the second link 320 that is changed as illustrated in FIG. 3A and FIG. 3B. Based on a change in the angle of the first link 310 and the second link 320, the angular displacement sensor 420 may sense the angle change, which may be used to check the stroke S of the cylinder 131 of the MR damper 130 and the piston 132. In an example of the present disclosure, an angular displacement sensor 420 may be used to measure the stroke S of the MR damper 130, but the present disclosure is not limited thereto. The stroke S may also, or alternatively, be directly measurable using a distance sensor such as a laser sensor. However, the distance sensor may be vulnerable to interference with foreign substances such as dust generated during landing and an impact generated during the landing.

A controller 500 may determine a current value to be applied to the MR damper 130 based on data transmitted from the sensor unit 400. In addition, the controller 500 may be configured to determine a landing time based on the data transmitted from the sensor unit 400. Based on the landing time, the controller 500 may transmit a braking signal to a braking unit 700.

The controller 500 may determine the current value to be applied to the MR damper 130 using the acceleration sensor 410 and the angular displacement sensor 420. The controller 500 may perform sky hook control and/or load control (e.g., simultaneously perform sky hook control and load control). Here, the sky hook control may use a method of reducing vertical acceleration due to disturbance such as an impact on the urban air mobility vehicle during landing by installing a damper on a virtual reference surface, such as a control algorithm that suppresses the movement of the aircraft vertically. In addition, the controller 500 may control a current applied to the MR damper 130 based on a motion state of the MR damper 130 and/or a load acting on the MR damper 130 using data obtained through the acceleration sensor 410.

The controller 500 may obtain an acceleration value in a direction of an axis perpendicular to the ground measured by the acceleration sensor 410, and may integrate the acceleration value to check the speed of the casing 110 to which an upper chamber 133 of the MR damper 130 is connected. In addition, the controller 500 may obtain a displacement value measured by the angular displacement sensor 420, and may differentiate the displacement value to check speed of the stroke S of the MR damper 130.

The controller 500 may generate damping force based on a vertical speed of the casing 110 and a speed of the stroke S. For example, the controller 500 may generate a damping force by distinguishing a case where a value obtained by multiplying a vertical speed of the casing 110 by the speed of the stroke S is '0 (zero)' or more and a case where a value obtained by multiplying a vertical speed of the casing 110 by the speed of the stroke S is less than '0'. The controller 500 may generate the damping force based on a size of a value obtained by multiplying a predetermined constant by the vertical speed of the casing 110. When this is expressed as an equation, it may be as shown in Equation 1 below.

$$v \cdot s \geq 0 \rightarrow F_1 = C \times v \qquad \text{<Equation 1>}$$

Here, v may be a vertical speed in the casing 110, s may be speed of the stroke S, $F_1$ may be a damping force of the MR damper 130, C may be stiffness of the MR damper 130 and $v_q$ may be a viscosity of the MR fluid in the MR damper 130 with applied current q.

Conversely, when a value obtained by multiplying the vertical speed of the casing 110 by the speed of the stroke S is less than '0,' the damping force may not develop. This may be expressed as Equation 2 below.

$$v \cdot s < 0 \rightarrow F_2 = 0 \qquad \text{<Equation 2>}$$

Again, v may be a vertical speed of the casing 110, s may be speed of the stroke S, and F2 may be a damping force of the MR damper 130 under this condition.

The controller 500 may comprise a nonvolatile memory (not illustrated) configured to store instructions to perform any of the functions described herein. For example, the instructions may indicate an algorithm for controlling operations of various components of the aircraft and/or software instructions for reproducing the algorithm. The controller 500 may comprise a processor (not illustrated) configured to execute the instructions, e.g., so as to perform operations described herein. Here, the memory and the processor may be implemented as individual chips. Alternatively, the memory and the processor may be implemented as a single chip integrated with each other. The processor may take the form of one or more processors.

The output unit 600 may comprise a power source, which may be connected to the MR damper 130. The output unit 600 may allow a current to flow through the MR damper 130 based on the current value transmitted from the controller 500. Here, the output unit 600 may be a power amplifier, but the present disclosure is not limited thereto.

The braking unit 700 may be a device configured to generate a braking force (e.g., by applying friction force to the wheel unit 200 of the landing gear). For example, the braking force may be generated by operating brake discs (not illustrated) provided on opposite sides of the wheel unit 200 (e.g., using a hydraulic circuit).

Each component of present disclosure may be connected in a wired or wireless manner to exchange information. For example, data may be exchanged using communication means such as Ethernet, media-oriented systems transport (MOST), Flexray, a controller area network (CAN), a local interconnect network (LIN), Internet, LTE, 5 G, Wi-Fi, Bluetooth, Near Field Communication (NFC), Zigbee, Radio Frequency (RF), and the like.

Figure 5A:
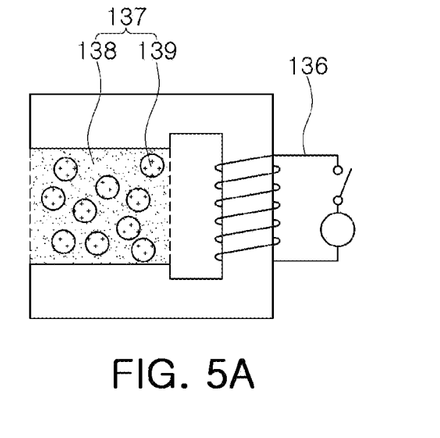
FIG. 5A and FIG. 5B are a view illustrating an operation of an MR fluid according to a current according to an example of the present disclosure.
Figure 5B:
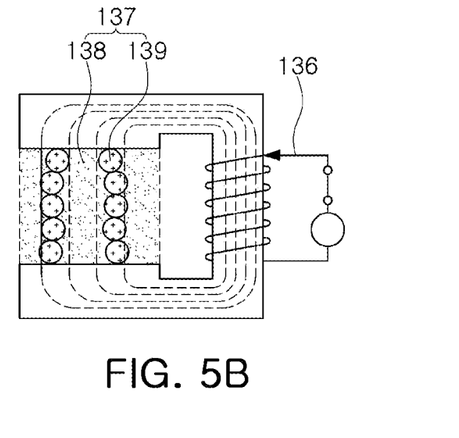

FIG. 4A and FIG. 4B are a view exemplarily illustrating an operation of the MR damper 130 according to an example of the present disclosure, and FIG. 5A and FIG. 5B are a view exemplarily illustrating an operation of an MR fluid 137 according to a current according to an example of the present disclosure.

The MR damper 130 may be a damper comprising the MR fluid 137. The MR fluid 137 may be a magnetic fluid, e.g., a solution in which magnetic particles 139 having micron-sized magnetism are dispersed in a non-conductive solvent 138, such as silicon oil or mineral oil. When a magnetic field is not applied to the MR fluid 137, the magnetic particles 139 move freely, but when the magnetic field is applied to the MR fluid 137, the magnetic particles 139 may be polarized and arrange in a direction parallel to the magnetic field, which may cause increased resistance of the MR fluid 137 to shear force or flow.

The MR damper 130 may include a cylinder 131 and a piston 132. The cylinder 131 may have a cylindrical shape in which an upper part thereof is closed and a lower portion thereof is open and/or openable. The piston 132 may be inserted and coupled through the open lower portion of the cylinder 131. The piston 132 may be configured to move linearly within the cylinder 131. The cylinder 131 may be coupled to the casing 110, and the piston 132 may be coupled to the steering rod 120. The piston 132 may have a cylindrical shape forming an internal space, and at least a portion of the piston 132 may be inserted into the cylinder 131.

An upper chamber 133 may be formed by an internal space of the cylinder 131 and an outer surface of the piston 132 inserted into the internal space of the cylinder 131. A lower chamber 134 may be formed inside the piston 132. One or more flow path holes 140 may be formed to allow the MR fluid 137 to flow between the upper chamber 133 and the lower chamber 134. For example, the one or more flow path holes 140 may be formed on an upper surface of the piston 132, and a flow path from the upper chamber 133 through the one or more flow path holes 140 to the lower chamber 134 may be formed through which the MR fluid 137 may flow. A coil 136 may be wound along the flow path, and a relief valve 135 may be provided in a portion of the flow path.

The relief valve 135 may be configured to operate according to the movement of the piston 132. The relief valve 135 may be closed when the piston 132 moves further into the cylinder 131 (e.g., ascends). The relief valve 135 may open when the piston 132 moves further out of the cylinder 131 (e.g., descends). When the piston 132 ascends, the MR fluid 137 within the cylinder 131 flows inward through the flow path hole 140 of the upper portion of the piston 132 and flows from the upper portion to the lower portion of the piston 132, and the relief valve 135 is kept closed by hydraulic pressure of the MR fluid 137. In this case, the MR fluid 137 flows along the flow path of the piston 132. When the piston 132 descends, the MR fluid 137 filled in the piston 132 flows from the lower portion to the upper portion of the piston 132, and the relief valve 135 is opened. In this case, the MR fluid 137 flows to both sides through the flow path of the piston 132 and the relief valve 135.

The piston 132 may be configured to perform a linear motion with respect to the cylinder 131 when the piston 132 is inserted into the cylinder 131. When the piston 132 ascends, the MR fluid 137 may flow from the outside of the piston 132 to the inside. Conversely, when the piston 132 is drawn out from the cylinder 131, that is, when the piston 132 descends, the MR fluid 137 may flow from the inside of the piston 132 to the outside.

The MR damper 130 may generates compressive force when the piston 132 ascends, and the MR damper 130 may generate a tensile force when the piston 132 descends, thereby opening or closing the relief valve 135. The MR fluid 137 may flow inward or outward through the flow path of the piston 132 according to the movement of the piston 132.

Referring to FIGS. 5A and 5B, the coil 136 may be wound and formed at the flow path of the piston 132. As exemplarily illustrated in FIG. 5A, the MR fluid 137 may flow freely in a state in which no current is applied. However, as illustrated in FIG. 5B, when the current is applied to the coil 136, the magnetic particles 139 having magnetism in the MR fluid 137 tend to arrange along the magnetic field, which may interfere with the flow of the non-conductive solvent 138 such as silicone oil or mineral oil. That is, when the current is applied to the coil 136, the viscosity of the MR fluid 137 may increase according to the strength of the current applied to the coil 136, thereby increasing the damping force of the MR damper 130 caused by the MR fluid 137.

A bearing (not illustrated) may be formed between an inner surface of the cylinder 131 and an outer surface of the piston 132. The bearing may consist of a flow bearing and/or a fixed bearing. The flow bearing may be fixed to the outer surface of the piston 132, and the fixing bearing may be fixed to the inner surface of the cylinder 131. Since the bearing is formed between the inner surface of the cylinder 131 and the outer surface of the piston 132, the piston 132 may perform a linear motion with respect to the cylinder 131.

Figure 6:
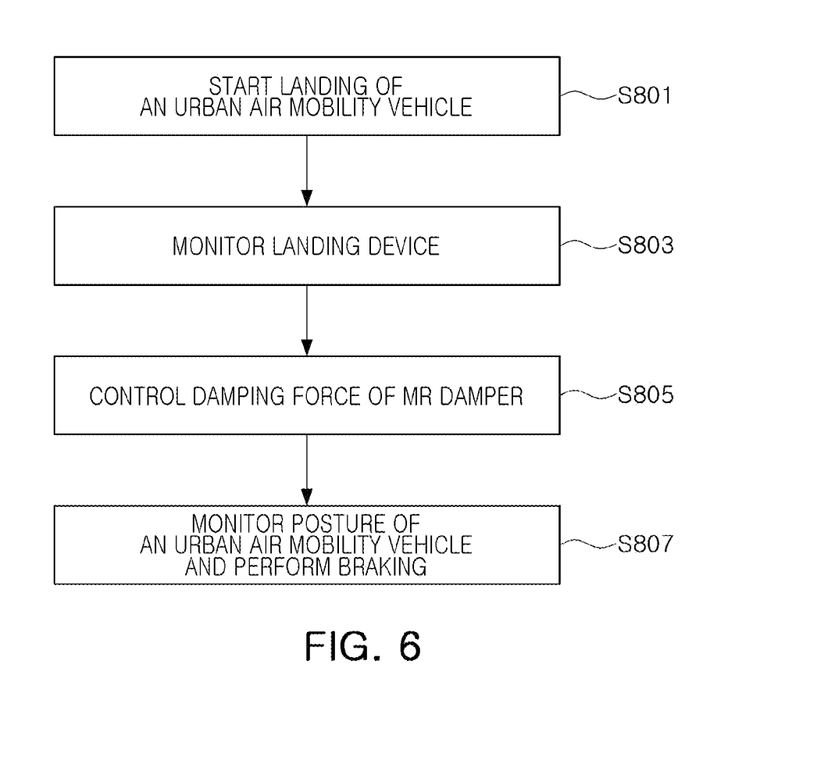
FIG. 6 is a control flowchart of a landing gear system including an MR damper according to an example of the present disclosure.

FIG. 6 is a control flowchart of a method using an MR damper 130 for landing gear according to an example of the present disclosure.

Referring to FIG. 6, when the urban air mobility vehicle (as an example aircraft) starts landing, the tire 220 of the urban air mobility vehicle may collide with the ground, thus receiving an impact load. The impact load may be absorbed through the landing gear (S801).

The controller 500 may monitor a posture of the urban air mobility vehicle through the sensor unit 400 (S803). The controller 500 may monitor the posture continuously and/or periodically, and/or may begin monitoring based on information indicating that landing has begun and/or is occurring. If the posture of an urban air mobility vehicle becomes unstable due to impact, it may be necessary to monitor the posture of an urban air mobility vehicle, and control the damping force of the MR damper 130 and/or perform the braking. The controller 500 may check data on speed and/or a load acting on the MR damper 130 based on data measured by the angular displacement sensor 420 and/or the acceleration sensor 410. For example, information on the load acting on the MR damper 130 may be obtained by multiplying a value of the stroke S obtained through each angular displacement sensor 420 by the stiffness of the MR damper 130.

The controller 500 may control the damping force of the MR damper 130 by analyzing data on the load and applying the current to the MR damper 130 (S805). The controller 500 may determine a current value to be applied to the MR damper 130 based on the data obtained by the sensor unit 400, and the output unit 600 may apply the current to the MR damper 130 based on the determined current value. The controller 500 may control the intensity of the current based on the displacement and acceleration of the MR damper 130, and the magnetic field is formed according to the magnitude of the current applied to the MR damper 130 such that the stiffness of the MR fluid 137 is changed, thereby absorbing an impact load applied during landing.

Stabilization of the posture of the fuselage of the urban air mobility vehicle (e.g., pitch, yaw, or roll) may be confirmed, and a braking signal may be applied to the braking unit of the urban air mobility vehicle (S807). Existing landing control systems start braking based on a signal from a weight of wheel (WOW) sensor, a contact type sensor provided in the urban air mobility vehicle. However, when braking is initiated based on the WOW sensor, (i.e., a contact type sensor), the WOW sensor is repeatedly in contact or out of contact due to vibration of the urban air mobility vehicle during the landing, and accordingly, the braking signal may be transmitted as reliable landing information only after the urban air mobility vehicle is fully stabilized. On the contrary, the landing gear system with the MR damper 130 according to an example of the present disclosure may check a landing state of the urban air mobility vehicle in real-time using the acceleration sensor 410 and the angular displacement sensor 420 and transmit the braking signal in a preset state.

An aspect of the present disclosure is to provide a landing gear system equipped with an MR damper which can sense a state of the MR damper depending on the landing of an urban air mobility vehicle and control damping force of the MR damper 130.

According to an aspect of the present disclosure, a landing gear system with an MR damper includes: a casing coupled to a fuselage of an urban air mobility vehicle; a steering rod in which one side thereof is inserted into the casing and the other side thereof is connected to a tire; a magnetorheological (MR) damper provided in the casing and including a cylinder coupled to the casing and a piston coupled to the steering rod; a sensor unit configured to measure a condition of the urban air mobility vehicle; and a controller configured to control damping force of the MR damper based on measurement data of the sensor unit, and the sensor unit may include a first sensor for measuring a stroke of the MR damper and a second sensor for measuring an acceleration of the casing.

The landing gear system with an MR damper may further includes a first link and a second link that are rotatably coupled to each other, the first link may be coupled to an outer surface of the casing, the second link may be coupled to the steering rod, and the first sensor may measure an angle formed by a coupling portion of the first link and the second link.

The controller may control the MR damper based on a stroke determined from the angle measured by the first sensor.

The second sensor may be provided in a portion of the casing and may measure acceleration in a direction perpendicular to a surface of the casing.

The controller may control damping force of the MR damper based on the speed of a change in a stroke and the speed in a direction perpendicular to the surface of the casing.

The controller controls damping force of the MR damper based on a value obtained by multiplying the speed of a stroke by the speed in a direction perpendicular to the surface of the casing.

The controller controls the magnitude of a current applied to the MR damper so that the damping force is generated in proportion to the speed in a direction perpendicular to the surface of the casing when a value obtained by multiplying the speed of the stroke by the speed in a direction perpendicular to the surface of the casing is greater than or equal to 0.

The controller may fail to generate the damping force when a value obtained by multiplying the speed of the stroke by the speed in a direction perpendicular to the surface of the casing is less than 0.

According to another aspect of the present disclosure, a landing gear system with an MR damper may include: a casing coupled to a fuselage of an urban air mobility vehicle; a magnetorheological (MR) damper provided in the casing and including a cylinder coupled to the casing, a piston configured to absorb an impact of an urban air mobility vehicle and reciprocate linearly inside the cylinder, and an MR fluid configured to move between the cylinder and the piston; a sensor unit configured to check a relative motion condition of the cylinder and the piston; and a controller configured to control the magnitude of a current applied to the MR damper based on measurement data of the sensor unit.

The sensor unit measures the speed in a direction perpendicular to the surface of the casing and a stroke that changes according to the relative motion of the cylinder and the piston.

The landing gear system with an MR damper may further include: a first link in which one side thereof moves in response to the cylinder; and a second link in which one side thereof is coupled to the first link, and the other side thereof moves in response to the piston, and the sensor unit may measure the speed of the stroke based on a change in an angle formed by the first link and the second link.

The sensor unit may include an acceleration sensor mounted in the casing, and the speed in a direction perpendicular to the surface of the casing may be derived by converting measurement data of the acceleration sensor.

The controller may control the current applied to the MR damper based on a change in the stroke and a change in the speed in a direction perpendicular to the surface of the casing.

The controller may control the magnitude of the current applied to the MR damper so that the damping force of the MR damper is generated in proportion to the speed in a direction perpendicular to a surface of the urban air mobility vehicle when a value obtained by multiplying the speed of the stroke by the speed in the direction perpendicular to the surface of the urban air mobility vehicle is greater than or equal to 0.

The controller may fail to apply a current to the MR damper when a value obtained by multiplying the speed of the stroke by the speed in a direction perpendicular to a surface of the urban air mobility vehicle is less than 0.

According to an aspect of the present disclosure, the load transmitted to urban air mobility vehicle may be controlled by adjusting the stiffness of an MR damper according to the landing state.

In addition, by controlling the load applied during landing of an urban air mobility vehicle, the load applied to a landing gear is reduced to increase the lifespan thereof, which may be advantageous in terms of maintenance.

Methods according to the present disclosure may be implemented in the form of program instructions that may be performed through various computer means and recorded in a non-transitory computer-readable medium. The computer-readable medium may store program instructions, a data file, a data structure, or the like, alone or in combination thereof. The program instructions recorded in a computer-readable medium may be specially designed and configured for the present disclosure or may be known to or usable by those skilled in the art of computer software.

Examples of computer-readable media include hardware devices specifically configured to store and perform program instructions, such as ROM, RAM, and flash memory. Examples of the program instructions may include not only a mechanical code such as things generated by a compiler but also a high-level language code executable on a computer using an interpreter. The aforementioned hardware unit may be configured to operate via one or more software modules for performing an operation of the present disclosure, and vice versa.

While examples have been described above, it will be apparent to those skilled in the art that modifications and variations could be made without departing from the scope of the present disclosure as defined by the appended claims.

What is claimed is:

1. A landing gear system, comprising:
   a casing configured to couple to a fuselage of an aircraft;
   a steering rod comprising a first side inserted into the casing and a second side connected to a tire;
   a magnetorheological (MR) damper, in the casing, that comprises a cylinder coupled to the casing and a piston coupled to the steering rod;
   a sensor unit configured to acquire measurement data of a state of the aircraft; and
   a controller configured to control, based on the measurement data, a damping force of the MR damper,
   wherein the sensor unit comprises a first sensor for measuring a stroke of the MR damper and a second sensor for measuring an acceleration of the casing.

2. The landing gear system according to claim 1, further comprising:
   a first link; and
   a second link,
   wherein the first link is coupled to an outer surface of the casing, the second link is coupled to the steering rod, and the first link is coupled to the second link, and
   wherein the first sensor is configured to measure an angle between the first link and the second link.

3. The landing gear system according to claim 2, wherein the controller is configured to control the MR damper based on information, from the first sensor, indicating the angle.

4. The landing gear system according to claim 1, wherein the second sensor is configured to measure acceleration in a direction perpendicular to a surface of the casing.

5. The landing gear system according to claim 1, wherein the controller is configured to control a damping force of the MR damper based on received information indicating:
   a stroke of the piston, and
   a speed of the casing in a direction perpendicular to a ground.

6. The landing gear system according to claim 1, wherein the controller is configured to control a damping force of the MR damper based on a value obtained by multiplying a speed of a stroke of the piston by a speed of the casing in a direction perpendicular to a ground.

7. The landing gear system according to claim 6, wherein the controller is configured to, based on a determination that the value is greater than or equal to 0, control a magnitude of a current applied to the MR damper so that the damping force is generated in proportion to the speed of the casing in the direction perpendicular to the ground.

8. The landing gear system according to claim 6, wherein the controller is configured to, based on a determination that the value is less than 0, apply no current to the MR damper.

9. A landing gear system comprising:
   a casing configured to couple to a fuselage of an aircraft;
   a magnetorheological (MR) damper, in the casing, that comprises a cylinder coupled to the casing, a piston configured to absorb an impact of the aircraft and reciprocate linearly inside the cylinder, and an MR fluid configured to move between the cylinder and the piston;
   a sensor unit configured to check a relative motion condition of the cylinder and the piston; and
   a controller configured to control a magnitude of a current applied to the MR damper based on measurement data of the sensor unit,
   wherein the sensor unit is configured to measure:
   a speed of the casing in a direction perpendicular to a ground, and
   a stroke of the piston that changes with relative motion of the cylinder and the piston.

10. The landing gear system according to claim 9, further comprising:
    a first link having one side configured to move in response to the cylinder; and
    a second link having one side coupled to the first link, and another side that moves in response to the piston,
    wherein the sensor unit is configured to measure a speed of the stroke based on a change in an angle formed by the first link and the second link.

11. The landing gear system according to claim 9, wherein the sensor unit comprises an acceleration sensor coupled to the casing, and
    the speed of the casing in the direction perpendicular to the ground is based on measurement data of the acceleration sensor.

12. The landing gear system according to claim 9, wherein the controller is configured to control the current applied to the MR damper based on a change in the stroke of the piston and a change in the speed of the casing in the direction perpendicular to the ground.

13. The landing gear system according to claim 9, wherein the controller is configured to, based on a determination that a value obtained by multiplying a speed of the stroke of the piston by the speed of the casing in the direction perpendicular to the ground is greater than or equal to 0, control the magnitude of the current applied to the MR damper so that a damping force of the MR damper is proportional to the speed of the casing in the direction perpendicular to the ground.

14. The landing gear system according to claim 9, wherein the controller is configured to, based on a determination that a value obtained by multiplying a speed of the stroke of the piston by the speed of the casing in the direction perpendicular to the ground is less than 0, apply no current to the MR damper.

* * * * *